US012669618B2

(12) United States Patent
Yoshida

(10) Patent No.: US 12,669,618 B2
(45) Date of Patent: Jun. 30, 2026

(54) SIGNAL PROCESSING APPARATUS, SIGNAL PROCESSING METHOD AND PROGRAM

(71) Applicant: NTT, Inc., Tokyo (JP)

(72) Inventor: Seiji Yoshida, Tokyo (JP)

(73) Assignee: NTT, Inc., Tokyo (JP)

( * ) Notice: Subject to any disclaimer, the term of this patent is extended or adjusted under 35 U.S.C. 154(b) by 211 days.

(21) Appl. No.: 18/712,913

(22) PCT Filed: Dec. 21, 2021

(86) PCT No.: PCT/JP2021/047367
§ 371 (c)(1),
(2) Date: May 23, 2024

(87) PCT Pub. No.: WO2023/119430
PCT Pub. Date: Jun. 29, 2023

(65) Prior Publication Data
US 2025/0028061 A1      Jan. 23, 2025

(51) Int. Cl.
G01S 19/31 (2010.01)
G01S 19/09 (2010.01)

(52) U.S. Cl.
CPC .............. G01S 19/31 (2013.01); G01S 19/09 (2013.01)

(58) Field of Classification Search
CPC ................................. G01S 19/31; G01S 19/09

USPC ..................................................... 342/357.71
See application file for complete search history.

(56) References Cited

U.S. PATENT DOCUMENTS

| | | | | |
|---|---|---|---|---|
| 2021/0377907 A1* | 12/2021 | Choi | ...................... | H04W 40/12 |
| 2024/0023153 A1* | 1/2024 | Palenius | ............. | H04W 72/542 |

OTHER PUBLICATIONS

Seiji Yoshida et al., "Positional Information Service with High Added Value Based on Cooperation between GNSS and Networks", NTT Technical Review vol. 17 No. 6 Jun. 2019, pp. 8-12.

* cited by examiner

*Primary Examiner* — Harry K Liu
(74) *Attorney, Agent, or Firm* — IPUSA, PLLC

(57) ABSTRACT

A signal processing apparatus includes circuitry configured to measure a relative displacement amount of the signal processing apparatus for each predetermined measurement period, measure a first delay time corresponding to a time period required for the signal processing apparatus to output a positioning solution, and estimate a position of the signal processing apparatus at a time after a current time by the first delay time, based on the positioning solution, the relative displacement amount for each measurement period, the first delay time, and a second delay time. A positioning server determines the positioning solution based on observation data related to a GNSS signal, and the second delay time corresponds to a time period from transmission of the observation data to the positioning server to reception of the positioning solution.

8 Claims, 5 Drawing Sheets

SIGNAL PROCESSING APPARATUS, SIGNAL PROCESSING METHOD AND PROGRAM

TECHNICAL FIELD

The present invention relates to a signal processing apparatus, a signal processing method, and a program.

BACKGROUND ART

Positioning that is performed using global navigation satellite systems (GNSS) has been utilized in a wide range of fields. Generally, an antenna (hereinafter, referred to as a GNSS antenna) for receiving global navigation satellite signals (hereinafter, referred to as GNSS signals) and equipment (hereinafter, referred to as a GNSS receiver) for processing the GNSS signals and outputting positioning solutions by positioning calculation processing are installed at a location (hereinafter, referred to as a reception position) where the GNSS signals are received and positioning is performed. On the other hand, in another manner, a "cloud GNSS positioning architecture" that allows at least a part of the positioning calculation processing to be performed on a server (hereinafter, referred to as a positioning server) that is installed on a cloud/edge infrastructure via a communication network is also being considered.

CITATION LIST

Non-Patent Document

Non-Patent Document 1: Seiji Yoshida et al., "Positional Information Service with High Added Value Based on Cooperation between GNSS and Networks", NTT Technical Review Vol. 17 No. 6 Jun. 2019

SUMMARY OF THE INVENTION

Technical Problem

However, in a conventional cloud GNSS positioning architecture, due to a propagation delay in a signal, which is generated when communicating with the positioning server via a communication network, or fluctuations in the propagation delay, a delay time or fluctuations in the delay time which cannot be quantitatively predicted in an output of a positioning solution obtained on a terminal side occur. For the fluctuations in the delay time, the magnitude of the fluctuations in the delay time can be reduced by applying a jitter buffer or the like, which results in a trade-off indicating that an additional delay time depends on a setting value of a buffer depth.

One embodiment of the present invention has been carried out in view of the above point, and an object of the present invention is to output a positioning solution with high real-time performance.

Solution to Problem

In order to achieve the object, a signal processing apparatus according to one embodiment is a signal processing apparatus connected to a positioning server that calculates a positioning solution from observation data of a GNSS signal via a communication network, the signal processing apparatus including a GNSS signal reception unit configured to receive the GNSS signal and create the observation data, a first communication unit configured to transmit the observation data to the positioning server, a second communication unit configured to receive the positioning solution from the positioning server, a relative positioning unit configured to measure a relative displacement amount of the signal processing apparatus at each predetermined measurement period, a delay measurement unit configured to measure a first delay time representing a time required for an output interface included in the signal processing apparatus to output the positioning solution, and an estimation unit configured to estimate a position of the signal processing apparatus at a time earlier than a current time by the first delay time based on the positioning solution, the relative displacement amount for each measurement period, the first delay time, and a second delay time indicating a time from transmission of the observation data to the positioning server to reception of the positioning solution.

Effects of the Invention

A positioning solution with high real-time performance can be output.

DESCRIPTION OF EMBODIMENTS

Figure 1:
FIG. 1 is a diagram for illustrating a configuration example of the overall cloud GNSS positioning system according to the present embodiment.

Hereinafter, one embodiment of the present invention will be described.

<Cloud GNSS Positioning Architecture and Related Techniques of the Architecture>

First, before describing the present embodiment, a conventional cloud GNSS positioning architecture and related technologies of the architecture will be described.

In the cloud GNSS positioning architecture, a terminal device including a GNSS antenna, a GNSS receiver, and the like exists at a reception position, and the terminal device is connected to a positioning server that is installed on a cloud and/or an edge base (hereinafter, both the cloud and the edge base are collectively referred to as "clouds") via a communication network. The terminal device receives a GNSS signal by the GNSS antenna, and transmits, to the positioning server, observation data (raw data) that is acquired after the GNSS receiver performs RF signal processing, baseband signal processing, and the like. The positioning server performs positioning arithmetic processing by using the observation data transmitted from the terminal device, and transmits the resulting positioning solution to the terminal device.

As a data format for transmitting the observation data to the positioning server on the cloud, for example, a Radio Technical Commission for Maritime Services (RTCM) format or the like is used. In addition, as a data format for transmitting the positioning solution from the positioning server, for example, the National Marine Electronics Association (NMEA) 0183 format or the like is used. As a protocol for transferring these data pieces over the Internet Protocol (IP) network, for example, TCP/IP based Network Transport of RTCM via Internet Protocol (Ntrip) or the like is used. In this case, an Ntrip Catser, which is a gateway device of the Ntrip protocol, is installed on the cloud, and session management including authentication or the like, traffic control or the like are performed.

The positioning solution output by the positioning arithmetic processing in the positioning server that is provided on the cloud includes a positioning solution by a code positioning method that uses a code of a navigation satellite signal (that is, a code positioning solution), and a positioning solution by a carrier phase positioning method that includes a Real Time Kinematic (RTK) method (that is, a carrier phase positioning solution).

The cloud GNSS positioning architecture is characterized in that the positioning solution can be indefinitely received not only at the reception position but also at a terminal device that is at an arbitrary point connected to a communication network. In such a manner, the cloud GNSS positioning architecture is suitable for use of a remote control or the like of a robot tractor and for an application such as a geographic information system (GIS).

Further, in the cloud GNSS positioning architecture, a high level of positioning arithmetic processing can be obtained using an abundant processing resource on the cloud. Further, there is a possibility that new positioning arithmetic processing which cannot be achieved by conventional positioning that is performed by the terminal device alone, namely a crowdsourcing approach of collecting data from a plurality of terminal devices and performing collaboration processing, or processing or the like that utilizes map space information such as three-dimensional map data, can be achieved.

In addition, in the cloud GNSS positioning architecture, it is possible to simplify some of the functions of the GNSS receiver on the terminal device side. Therefore, advantageously, the terminal device can be made compact with reduced cost and saving power.

On the other hand, as described above, in the cloud GNSS positioning architecture, due to the propagation delay and fluctuations in the signal generated when communicating with the positioning server via a communication network, the delay time and fluctuations in the delay time, which cannot be quantitatively predicted in the output of the positioning solution obtained on the terminal device side, occur. Further, the magnitude of the fluctuations in the delay time can be reduced by applying a jitter buffer or the like, but there is a trade-off indicating that an additional delay time depends on the setting value of the buffer depth.

An output delay (a lag time) of the positioning solution may cause performance degradation in applications requiring real-time performance (for example, an autonomous control in an automated vehicle, a vehicle body control in advanced drive-assistance systems (ADAS), and the like). For example, a vehicle traveling at 80 km/h moves about 2.2 m in 100 ms. In this case, when it is assumed that a delay time including a time required for positioning arithmetic processing by the positioning server on the cloud is 300 ms, the vehicle will move about 6.6 m in a traveling direction, at a timing at which a control system, which performs an autonomous control, a vehicle body control, and the like, receives the positioning solution, and as a result, various feedback controls are influenced by the moving of the vehicle.

In the following description, a case will be described using a cloud GNSS positioning system 1 that is realized by the cloud GNSS positioning architecture, in which an output delay in a positioning solution, due to a propagation delay of a signal generated in a communication network and fluctuations in the propagation delay, is eliminated and a positioning solution having high real-time performance is output.

<Configuration Example of Overall Cloud GNSS Positioning System 1>

FIG. 1 illustrates a configuration example of the overall cloud GNSS positioning system 1 according to the present embodiment. As illustrated in FIG. 1, the cloud GNSS positioning system 1 according to the present embodiment includes a terminal device 10 and a positioning server 20. Also, the terminal device 10 and the positioning server 20 are connected to each other so as to be able to communicate with each other via a communication network 30 such as the Internet.

The terminal device 10 is a device, an apparatus, software, or the like that functions as a terminal device in the cloud GNSS positioning architecture. Although the terminal device 10 may be fixedly installed at a certain reception position, it is assumed that the present embodiment is described using a case where the terminal device 10 is mainly mounted on a moving body such as a vehicle and the terminal device 10 moves simultaneously in accordance with the movement of the moving body.

The positioning server 20 is a device, an apparatus, software, or the like that functions as a positioning server in the cloud GNSS positioning architecture. The positioning server 20 includes at least a positioning engine for executing positioning arithmetic processing using observation data that is transmitted from the terminal device 10.

Although only one terminal device 10 is illustrated in the example illustrated in FIG. 1, a plurality of terminal devices 10 may be present. In addition, the positioning server 20 may be a distributed system that is constituted by a plurality of devices, for example.

<Configuration Example of Terminal Device 10>

Figure 2:
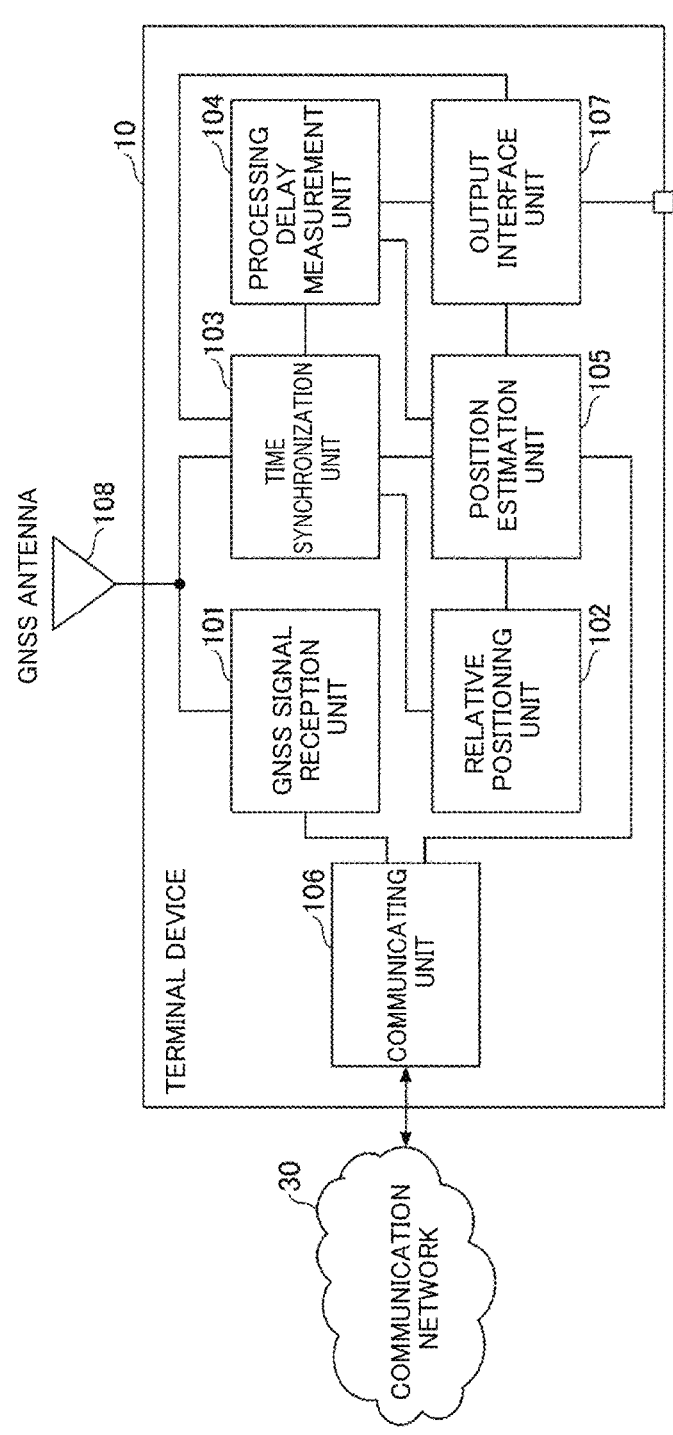
FIG. 2 is a diagram for illustrating a configuration example of a terminal device according to the present embodiment.

FIG. 2 illustrates a functional configuration of the terminal device 10 according to the present embodiment. As illustrated in FIG. 2, the terminal device 10 according to the present embodiment includes a GNSS signal reception unit 101, a relative positioning unit 102, a time synchronization unit 103, a processing delay measurement unit 104, a position estimation unit 105, a communicating unit 106, and an output interface unit 107. In addition, the terminal device 10 according to the present embodiment includes a GNSS antenna 108 for receiving a GNSS signal.

The GNSS signal reception unit 101 receives a GNSS signal from the GNSS antenna 108, performs RF signal processing, baseband signal processing, and the like, and outputs observation data. The GNSS signal reception unit 101 is realized by, for example, a GNSS receiver.

The relative positioning unit 102 measures a relative displacement amount of the terminal device 10. The relative positioning unit 102 is realized by, for example, a 6-axis (3-axis acceleration and 3-axis angular velocity) or 9-axis (3-axis acceleration, 3-axis angular velocity and 3-axis azimuth) inertial measurement unit (IMU) that is realized by a gyroscopic sensor (angular velocity sensor), an acceleration sensor, a magnetic compass, or the like; an encoder (odometry) or the like that measures a traveling distance from the number of rotations of an axle; visual odometry (VO) that measures a relative displacement amount from camera image data; and Lidar odometry (LO) or the like that measures relative displacement from Lidar point cloud data. The relative positioning unit 102 may be realized by any one of the components described above, or relative positioning unit 102 may be realized by a combination of two or more of the above components.

Figure 3:
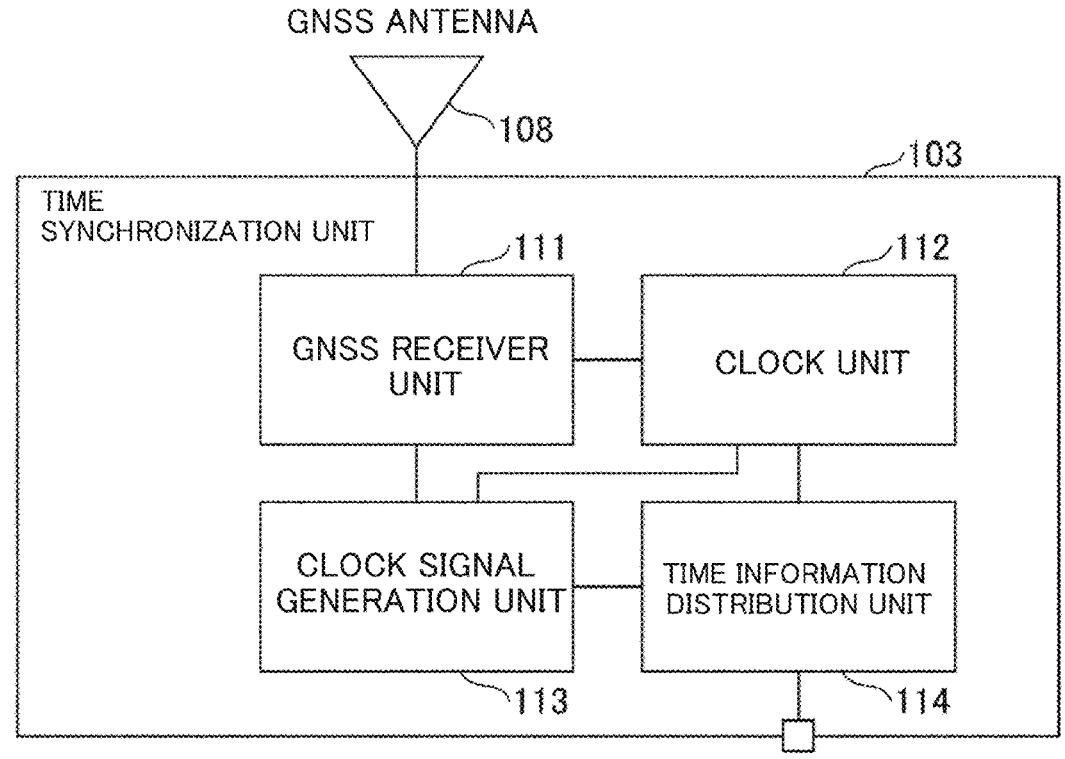
FIG. 3 is a diagram for illustrating a configuration example of a time synchronization unit according to the present embodiment.

The time synchronization unit 103 distributes at least the time information that is synchronized with an absolute time, to other units (that is, the relative positioning unit 102, the processing delay measurement unit 104, the position estimation unit 105, and the output interface unit 107). FIG. 3 illustrates a detailed configuration example of the time synchronization unit 103 according to the present embodiment. As illustrated in FIG. 3, the time synchronization unit 103 according to the present embodiment includes a GNSS receiver unit 111 for synchronizing with the absolute time, a clock unit 112 for generating time information synchronized with the absolute time, a clock signal generation unit 113 for generating a clock signal using a crystal, an atomic clock, or the like as a source oscillation, and a time information distribution unit 114 for distributing at least the time information to the other parts.

Here, as the absolute time, for example, a coordinated universal time (UTC) is used. Further, in the time information distribution unit 114, for example, synchronization signals such as a pulse per second (PPS), a network time protocol (NTP), or a precision time protocol (PTP) are used in the distribution of time information. At this time, the time information distribution unit 114 may simultaneously distribute clock signals together with the time information, by propagation means that is a physical layer such as synchronous Ethernet (SyncE).

In addition, the GNSS receiver unit 111 is realized by, for example, a GNSS receiver, but the GNSS receiver may be shared with the GNSS signal reception unit 101. Furthermore, even in a case where synchronization with the GNSS signal is interrupted, the time synchronization unit 103 allows the clock unit 112 to perform a self-running (holdover) operation for a fixed time period by using the clock signal that is supplied from the clock signal generation unit 113.

With this arrangement, the time synchronization unit 103 can provide the time synchronization and the frequency synchronization of the clock signal with high accuracy to the other units. It is assumed that the accuracy of the time synchronization provided by the time synchronization unit 103 is about several microseconds or more.

The processing delay measurement unit 104 measures a processing time (lag time) required from a time point when information necessary for self-position estimation is input to the position estimation unit 105, to a time point when the self-position estimated in the output interface unit 107 is output. As a method of measuring such a processing time, for example, a method of counting pulse signals that are clock signals distributed from the time synchronization unit 103, or a method or the like of stamping a time stamp based on time information distributed from the time synchronization unit 103 is used. The accuracy of the clock signal and the time stamp used in this description is maintained by the time synchronization unit 103.

The position estimation unit 105 estimates a self-position (that is, a position of the terminal device 10) at an arbitrary time, based on a positioning solution (GNSS positioning solution) from the positioning server 20 that is received by the communicating unit 106, a relative displacement amount measured by the relative positioning unit 102, and a processing time measured by the processing delay measurement unit 104. The position estimation unit 105 uses, for example, an extended Kalman filter (EKF), a particle filter (a particle filter, a Monte Carlo filter), or the like, and performs estimation of the self-position by processing executed by a central processing unit (CPU).

The communicating unit 106 transmits observation data to the positioning server 20, and receives a positioning solution from the positioning server 20. The communicating unit 106 uses, for example, a communication protocol such as an Ntrip, and is realized by a communication interface specified by a standard including a mobile communication such as long term evolution (LTE), WiFi, or a local area network (LAN).

The output interface unit 107 outputs a positioning solution representing the self-position estimated by the position estimation unit 105 to a predetermined output destination. The output interface unit 107 is realized, for example, by a communication interface of a machine such as serial communication, LAN, Universal Serial Bus (USB), or the like. For example, NMEA0183 or the like is used as the data format of the positioning solution (self-position) output by the output interface unit 107.

<Configuration Example of Terminal Device 10>

Figure 4:
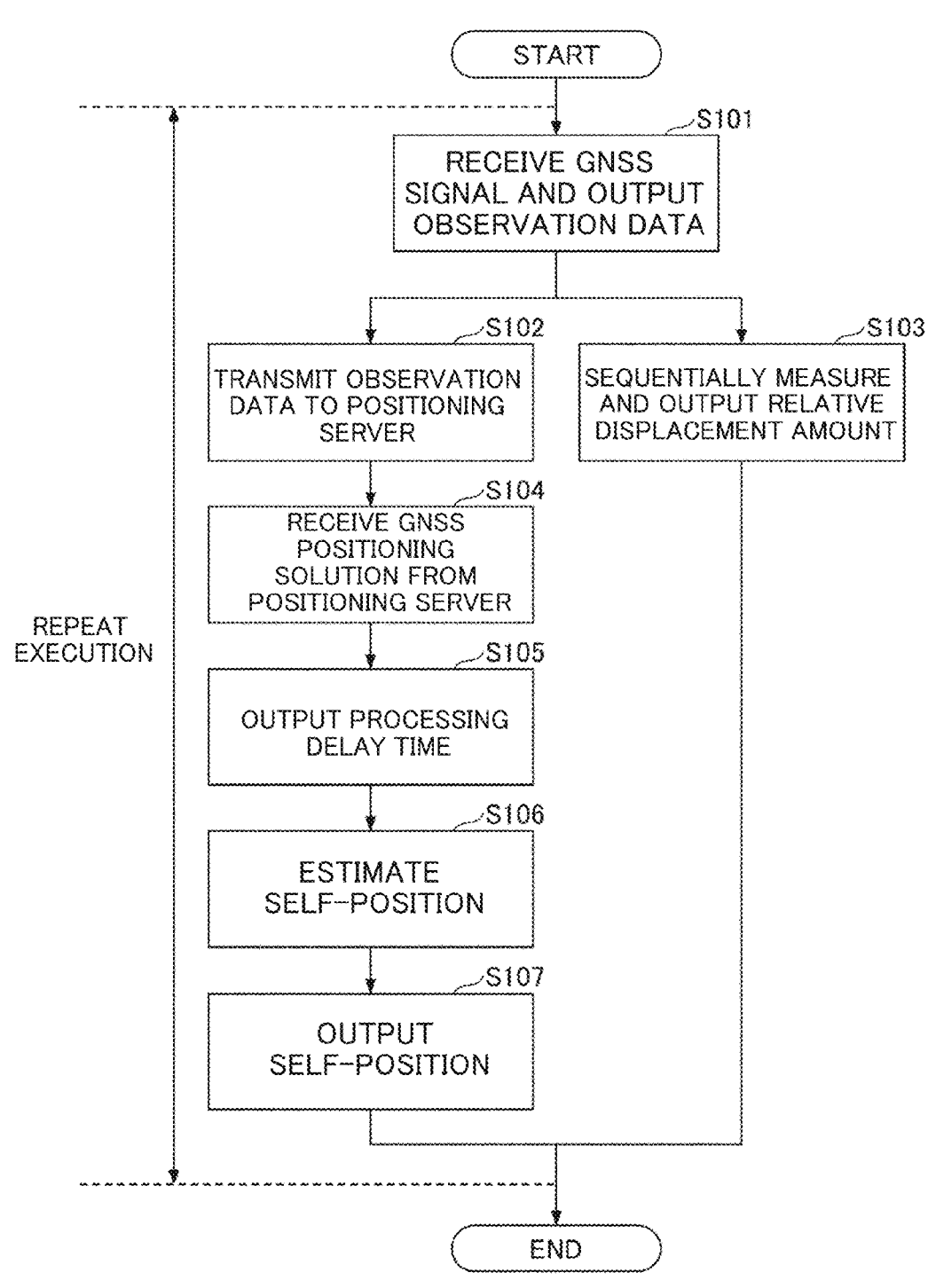
FIG. 4 is a diagram for illustrating an operation example of the terminal device according to the present embodiment.

An operation example of the terminal device 10 according to the present embodiment will be described with reference to FIG. 4. Note that steps S101 to S107 in FIG. 4 are repeatedly executed, for example, at predetermined time intervals.

Step S101: the GNSS signal reception unit 101 receives a GNSS signal from the GNSS antenna 108, performs RF signal processing, baseband signal processing, and the like, and outputs observation data. At this time, in a case where the reception time of the GNSS signal is expressed by $t_1$, the GNSS signal reception unit 101 measures a reception time $t_1$ in a state where the time bias of the GNSS receiver is corrected (that is, a state where the GNSS receiver is synchronized with the absolute time). The reception time $t_1$ is included in observation data generated by the GNSS signal reception unit 101, and is not affected by a propagation delay generated in a communication network in a subsequent communication process between the terminal device 10 and the positioning server 20.

Step S102: The communicating unit 106 transmits the observation data output from the GNSS signal reception unit 101 to the positioning server 20. Thus, a positioning solution is calculated from the observation data by a positioning engine of the positioning server 20, and the positioning solution is transmitted to the terminal device 10. The positioning solution includes a reception time $t_1$ of the GNSS signal.

Step S103: On the other hand, the relative positioning unit 102 sequentially measures the relative displacement amount of the terminal device 10 from the reception time $t_1$ of the GNSS signal, and sequentially outputs the relative displacement amount to the position estimation unit 105. Here, the relative positioning unit 102 synchronizes with the absolute time with high accuracy by the time information distributed from the time synchronization unit 103, and measures the relative displacement amount at each measurement time $t_2$ ($>t_1$).

For example, where a certain integer N is used, in a case where the measurement period of the relative displacement amount is $\Delta t_2$, the relative displacement amount is measured by each of to $=t_1+\Delta t_2$, $t_1+2\Delta t_2$, $t_1+3\Delta t_2$, . . . , and $t_1+N\Delta t_2$. However, in a case where the time when the terminal device 10 receives the positioning solution from the positioning server 20 is $t_3$, $t_1+N\Delta t_2 \leq t_3$ is established. That is, the relative displacement amount is measured for each measurement period $\Delta t_2$ from time $t_1$ to time $t_3$ by the relative positioning unit 102.

The relative displacement amount measured at each of the measurement times $t_2$ is sequentially output to the position estimation unit 105. The maximum value of a time difference between $t_2$ and $t_1$ (that is, $t_3$–$t_1$) corresponds to a delay time until the terminal device 10 transmits observation data from the terminal device 10 to the positioning server 20 and receives a positioning solution for the observation data. It is assumed that this delay time is, for example, about several hundred milliseconds.

Step S104: The communicating unit 106 receives a positioning solution from the positioning server 20. Hereinafter, the time $t_3$ when the positioning solution is received is referred to as the present time.

Step S105: The processing delay measurement unit 104 outputs the processing time (hereinafter, referred to as a processing delay time) required from the time when the position estimation unit 105 receives information required for self-position estimation to the time when the output interface unit 107 outputs the estimated self-position (positioning solution). Here, the processing delay measurement unit 104 synchronizes with the absolute time with high accuracy by the time information distributed from the time synchronization unit 103, measures the processing delay time with high accuracy (for example, accuracy of about 10 microseconds), and outputs the measured value $\Delta t$ to the position estimation unit 105. For the processing delay time $\Delta t$, for example, a value measured at the present time may be output, or an average value of values measured in the past may be output. Alternatively, for example, if a variation in the width in each processing delay time in the repetition of steps S101 to S107 is small (specifically, if the variation in the width is smaller than a certain minute threshold), a value measured once may be output as a constant value. It is assumed that the processing delay time $\Delta t$ is, for example, several hundred microseconds to several tens of milliseconds.

Figure 5:
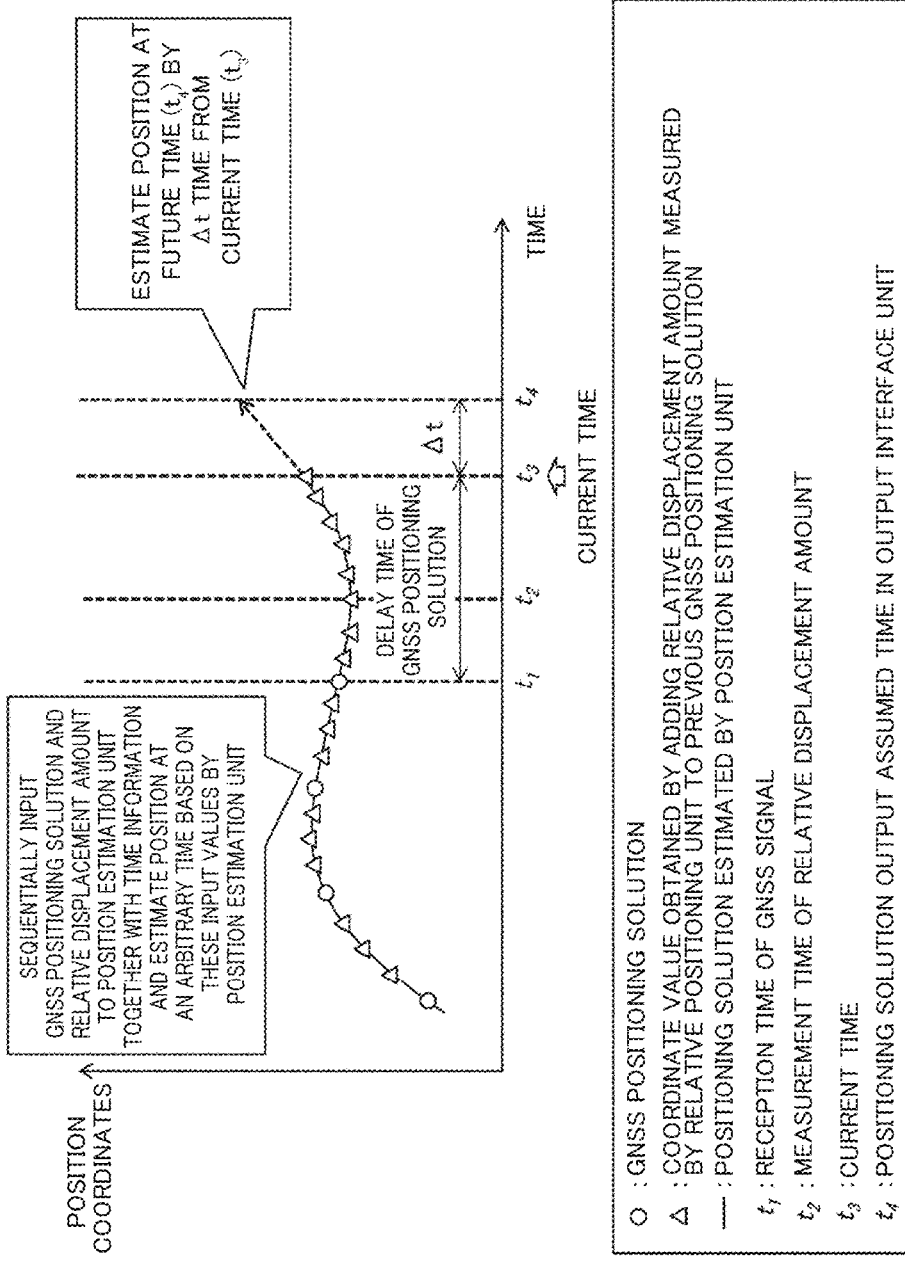
FIG. 5 is a diagram for illustrating an estimation example of a self-position.

Step S106: The position estimation unit 105 estimates the self-position at time $t_4 = t_3 + \Delta t$, which is the processing delay time $\Delta t$ ahead of current time to (that is, the estimated time at which the positioning solution is output by the output interface unit 107) based on the processing delay time $\Delta t$ measured by the processing delay measurement unit 104, the positioning solution at the reception time $t_1$ of the GNSS signal received by the communicating unit 106 from the positioning server 20, and each relative displacement amount measured at each measurement time $t_2$ by the relative positioning unit 102. Here, FIG. 5 illustrates an estimation example of the self-position. As illustrated in FIG. 5, the position estimation unit 105 estimates a self-position at $t_4$ which is a time at $\Delta t$ ahead using a displacement amount at each time $t_2$ from the time $t_1$ to the time $t_3$ and a positioning solution at the time $t_1$.

Step S107: The output interface unit 107 outputs a positioning solution representing the self-position estimated by the position estimation unit 105 to the predetermined output destination. Thus, by outputting the self-position (positioning solution) after $\Delta t$ time estimated by the position estimation unit 105, a highly accurate positioning solution (that is, a positioning solution close to the actual position of the moving body at the current time) with high real time property can be obtained in the moving body.

For example, since it is assumed that the GNSS positioning solution is received at a fixed frequency (for example, 10 Hz), it is assumed that the steps S101 to S107 are repeatedly executed every 100 milliseconds. Thus, the positioning solution with high real-time performance and high accuracy is continuously output.

Supplementary Notes

In the relative positioning unit 102, the relative displacement amount is measured at a frequency (for example, 100 Hz) higher than the positioning solution (that is, for example, $\Delta t_2$ is 10 milliseconds). A gyroscopic sensor, which is a core component of the IMU that realizes the relative positioning unit 102, includes types such as an MEMS gyroscope, an interferometric optical fiber gyroscope, and a ring laser gyroscope with different accuracies. However, as described above, the maximum value of the time difference between time $t_2$ and time $t_1$ corresponds to the turnaround time (TAT) of the communication network 30, which is several hundred milliseconds at most. Therefore, it is assumed that a cumulative error in the gyroscopic sensor during this period (TAT) is sufficiently small even when compared with the accuracy (several cm) expected in the GNSS positioning solution by carrier phase positioning, and the MEMS gyroscope with reduced costs can be used.

Further, the relative displacement amount is measured and output with high accuracy in the relative positioning unit 102, and the relative displacement amount is used in the position estimation unit 105, so that the positioning solution can be estimated and output with high frequency. Since the terminal device 10 according to the present embodiment can output a positioning solution with high real-time performance at high frequency, more precise control can be realized in an apparatus utilizing a positioning result, for example, an autonomous driving control device or a driving support system.

The positioning server 20 may be set at any place other than the cloud/edge base. For example, when the position of the vehicle is to be measured, it may be installed on an on-vehicle electronic control unit (ECU).

Further, although the delay time of the communication network 30 is taken into consideration in the present embodiment, the present embodiment can be applied to any case in which the output of the positioning solution is delayed by a factor other than the delay of the communication network 30.

As described above in detail, according to the present embodiment, in the cloud GNSS positioning system 1 realized by the cloud GNSS positioning architecture, regardless of the magnitude of the propagation delay time generated in the communication network 30, the real-time performance is high at a reception position (that is, the position of the terminal device 10), and the self-position estimation with high accuracy can be realized.

The present invention is not limited to the specifically disclosed embodiments, and various modifications, changes, combinations with known techniques, and the like can be made without departing from the scope set forth in the claims.

REFERENCE SIGNS LIST

1 Cloud GNSS positioning system
10 Terminal device
20 Positioning server
30 Communication network
101 GNSS signal reception unit
102 Relative positioning unit
103 Time synchronization unit 104 Processing delay measurement unit
105 Position estimation unit
106 Communicating unit
107 Output interface unit
108 GNSS antenna
111 GNSS receiver unit
112 Clock unit
113 Clock signal generation unit
114 Time information generation unit

The invention claimed is:

1. A signal processing apparatus configured to communicate with a positioning server via a communication network, the positioning server configured to calculate a positioning solution from observation data, the observation data being obtained from a global navigation satellite systems (GNSS) signal via the communication network, the signal processing apparatus comprising:

a receiver configured to receive the GNSS signal and create the observation data;

a first communication circuit configured to transmit the observation data to the positioning server;

a second communication circuit configured to receive the positioning solution from the positioning server; and circuitry configured to:

measure a relative displacement amount of the signal processing apparatus, for each measurement period;

measure a first delay time corresponding to a time period required for the signal processing apparatus to output the positioning solution; and estimate a position of the signal processing apparatus at a time after a current time by the first delay time, based on the positioning solution, the relative displacement amount for each measurement period, the first delay time, and a second delay time, the second delay time corresponding to a time period from transmission of the observation data to the positioning server to reception of the positioning solution.

2. The signal processing apparatus according to claim 1, wherein the circuitry is configured to measure, for each measurement period, the relative displacement amount during a time period from a first timing at which the receiver receives the GNSS signal to a second timing at which the receiver receives the positioning solution.

3. The signal processing apparatus according to claim 1, wherein the circuitry is configured to distribute at least time information that is synchronized with an absolute time.

4. The signal processing apparatus according to claim 1, wherein the circuitry is configured to output the estimated position to a target.

5. The signal processing apparatus according to claim 1, wherein the circuitry is configured to estimate the position of the signal processing apparatus at the time after the current time by the first delay time, by using an extended Kalman filter or a particle filter.

6. The signal processing apparatus according to claim 1, wherein the signal processing apparatus is mounted on a moving body including a vehicle.

7. A signal processing method by a signal processing apparatus configured to communicate with a positioning server via a communication network, the positioning server configured to calculate a positioning solution from observation data, the observation data being obtained from a global navigation satellite systems (GNSS) signal via the communication network, and the signal processing method comprising:

receiving the GNSS signal and creating the observation data;

transmitting the observation data to the positioning server;

receiving the positioning solution from the positioning server;

measuring a relative displacement amount of the signal processing apparatus for each measurement period;

measuring a first delay time corresponding to a time period that is required for the signal processing apparatus to output the positioning solution; and estimating a position of the signal processing apparatus at a time that is after a current time by the first delay time, based on the positioning solution, the relative displacement amount for each measurement period, the first delay time, and a second delay time, the second delay time corresponding to a time period from transmission of the observation data to the positioning server to reception of the positioning solution.

8. A non-transitory computer readable storage medium storing a program that causes a computer to execute the single processing method of claim 7.

* * * * *